July 11, 1950 — N. C. PRICE — 2,514,513
JET POWER PLANT WITH BOUNDARY LAYER CONTROL FOR AIRCRAFT
Original Filed March 6, 1942 — 4 Sheets-Sheet 1

INVENTOR
NATHAN C. PRICE
BY George Sullivan

July 11, 1950
N. C. PRICE
2,514,513
JET POWER PLANT WITH BOUNDARY LAYER CONTROL FOR AIRCRAFT
Original Filed March 6, 1942
4 Sheets-Sheet 2
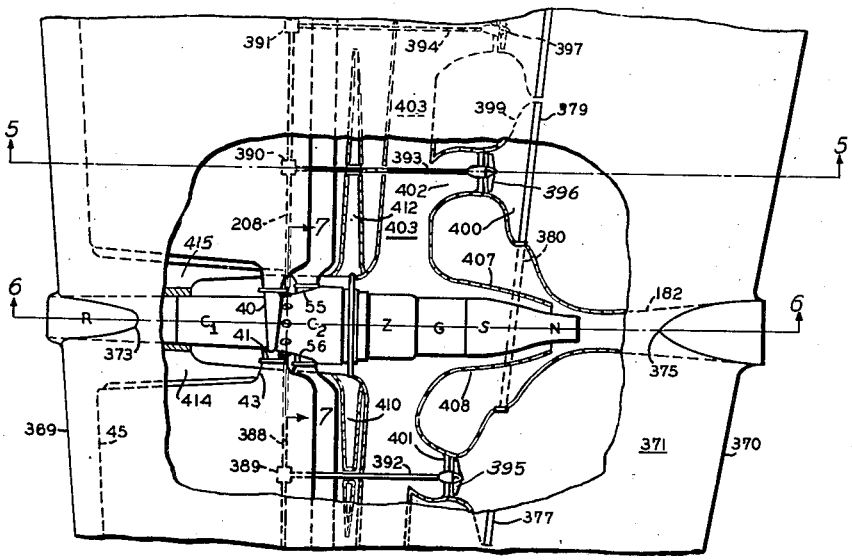
FIG—4
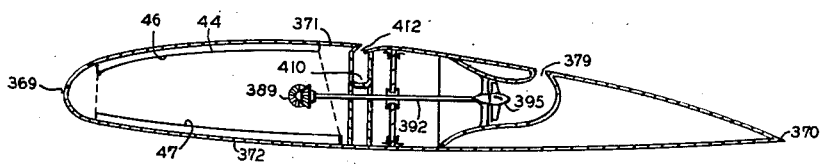
FIG—5
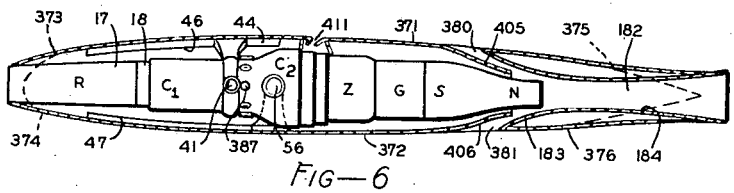
FIG—6
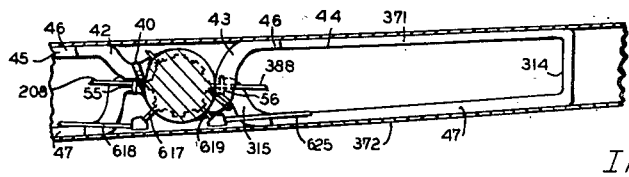
FIG—7
INVENTOR
NATHAN C. PRICE
BY George C. Sullivan

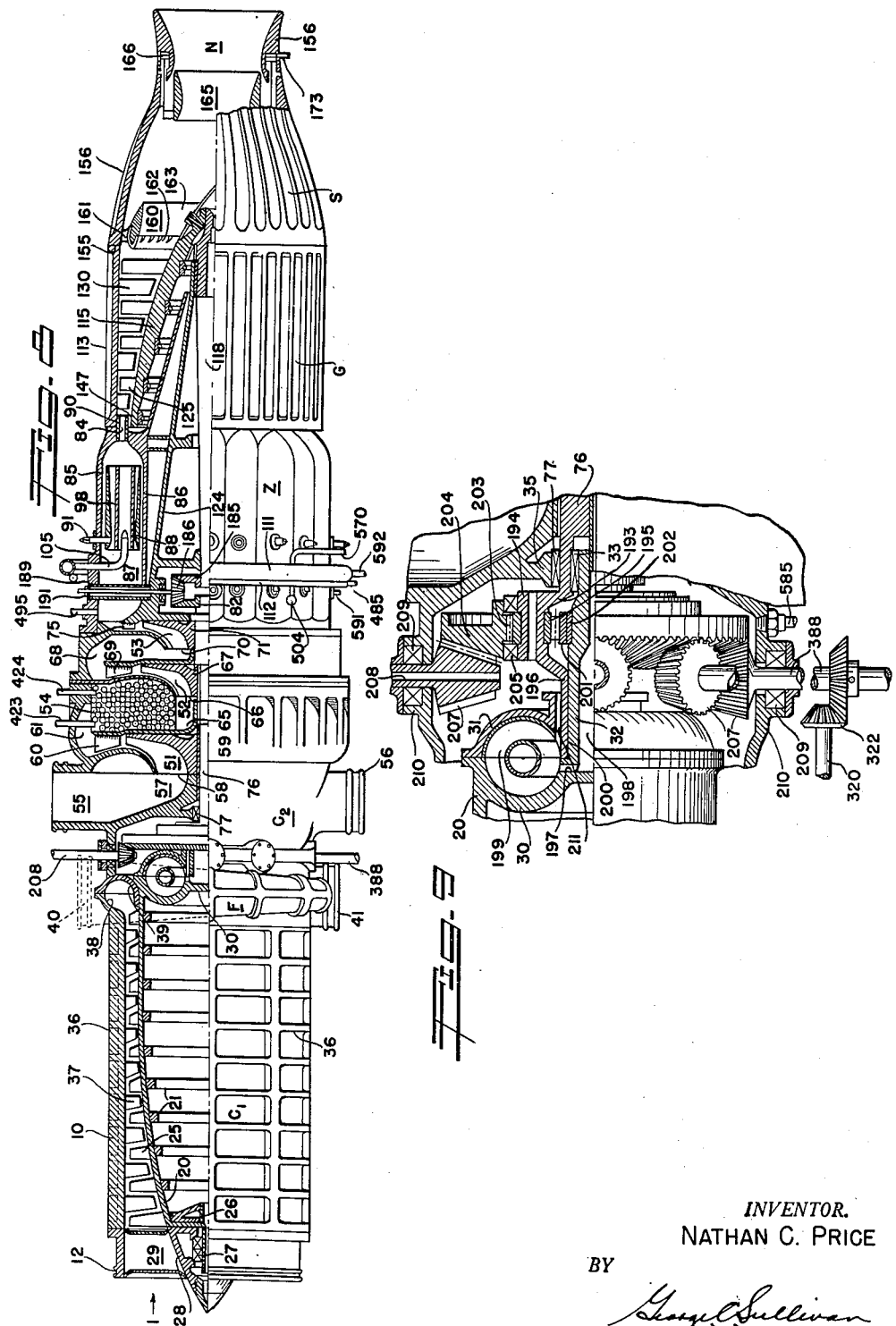

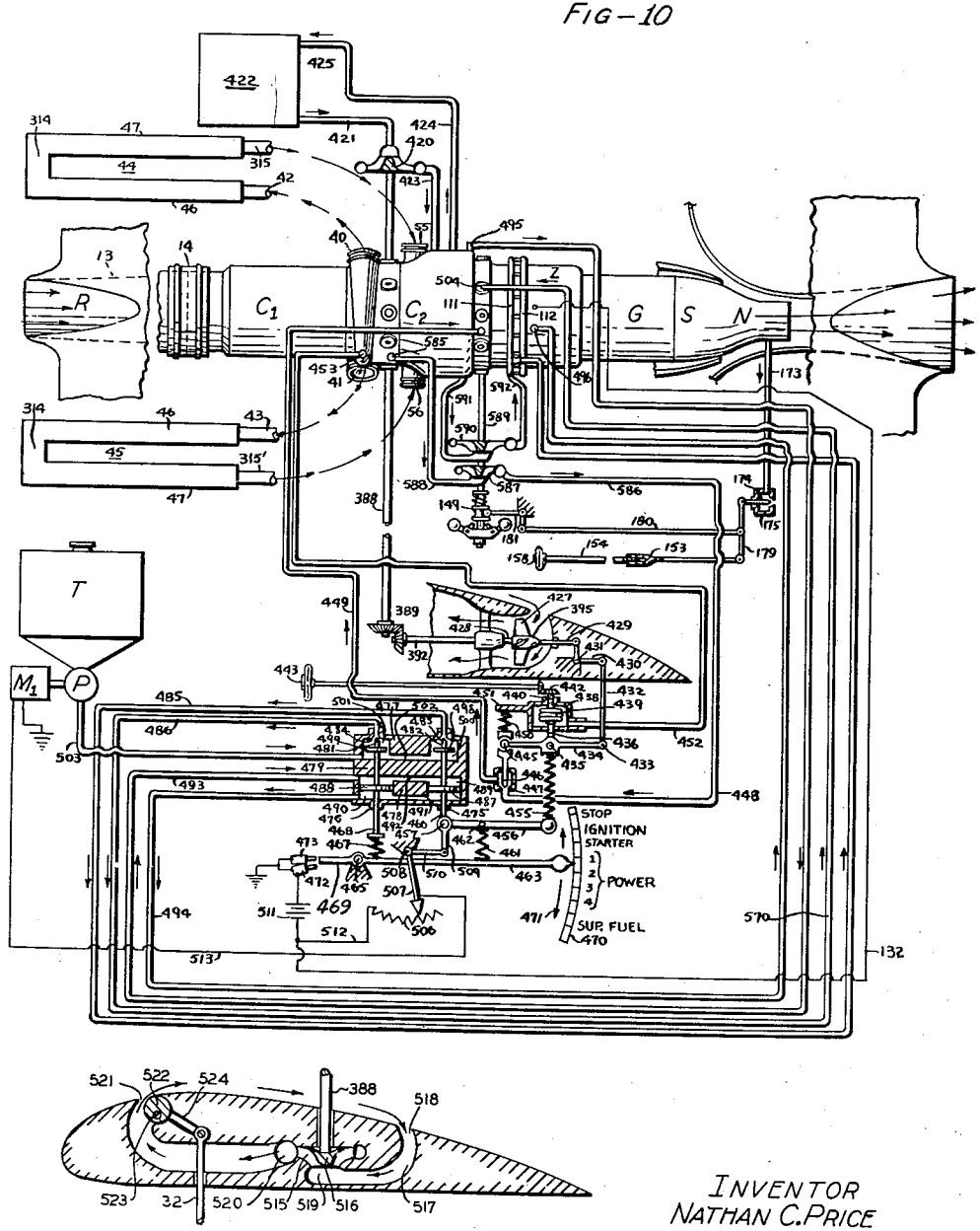

Patented July 11, 1950

2,514,513

UNITED STATES PATENT OFFICE 2,514,513

JET POWER PLANT WITH BOUNDARY LAYER CONTROL FOR AIRCRAFT

Nathan C. Price, Los Angeles, Calif., assignor to Lockheed Aircraft Corporation, Burbank, Calif.

Original application March 6, 1942, Serial No. 433,599. Divided and this application January 15, 1945, Serial No. 572,924

15 Claims. (Cl. 244—15)

This invention relates to prime movers, and relates more particularly to internal combustion reaction type power plants which find their principal applications in airplanes and other high velocity vehicles. This application is a division of application, Serial Number 433,599 filed in the United States Patent Office March 6, 1942.

Aircraft employing conventional propellers for their propulsion have a practical limit of attainable speeds, the efficiency of the propellers abruptly dropping off to a low value at velocities in the region of 500 miles per hour. The efficiency of the propellers operated in rarified atmospheres is low, precluding the use of such propulsion means in high-speed stratosphere flight. Furthermore, the frontal area of airplanes of high-speed operation must be reduced below that now possible with conventional power plants, and the lifting efficiency of the wings of such craft must also be increased.

It is therefore an object of this invention to provide a propulsive unit for aircraft and the like, which does not possess the aforementioned speed limitations of the conventional power plant and propeller combination. It is a further object of the invention to provide a propulsion unit which is capable of operating at augmented efficiency at speeds and altitudes in excess of those practical with conventional propeller apparatus. It is another object of the invention to provide a propulsive unit adapted to operate efficiently at supersonic speeds, and at altitudes within the stratosphere. It is also an object of the invention to provide a propulsive unit and associated apparatus capable of imparting increased economy and flight range to the aircraft.

It is another object of the invention to provide a highly effective combination of an internal combustion reaction type aircraft power plant and boundary layer control or removal means for increasing the aerodynamic efficiency of the wings or other surfaces of the craft. The invention provides either boundary layer suction slots or boundary layer control discharge slots, or both, in the wings or other surfaces of the airplane with the means for producing movement of air through slots operated and governed by the engine or power plant.

It is another object of this invention to provide a power plant of the character referred to in which the fan means, or air moving means, for the boundary layer slots are driven by accessory shafts of the power plant through the medium of a differential drive mechanism or transmission constituting an element of the plant per se and in such a manner that the power absorption of the fan means effects an automatic or self-regulating power distribution between the accessory drives and the blower of the plant, and reduces the power losses usually present in variable speed drives.

It is a further object of the invention to provide a power plant means and combination of the character above referred to in which the air received by the boundary layer suction slots is utilized to aid in cooling the power plant unit or parts thereof.

A still further object of the invention is to provide a power plant of the character referred to in which the reactive propulsive power plant embodies an augmenter to assist the jet in the rearward acceleration of a large reactive volume of air, and which acts to draw atmospheric air from within the boundary layer ducts, thereby increasing the aerodynamic efficiency of the airplane.

It is yet another object of the invention to provide a propulsion system and boundary layer control means wherein variable pitch boundary layer fans are governed by manual control means associated with a control responsive to pressure in the blower discharge of the power plant.

Other objects and features of the invention will become apparent from the following detailed description of the typical preferred forms of the invention illustrated in the accompanying drawings in which:

Figure 4 is a fragmentary plan view showing a typical installation of the invention in an airplane wing;

Figure 5 is a cross-sectional view taken on line 5—5 of Figure 4;

Figure 6 is a cross-sectional view taken on line 6—6 of Figure 4;

Figure 7 is a fragmentary sectional view taken on line 7—7 of Figure 4;

Figure 8 is an elevation in partial cross-section of the general assembly of the power plant unit of the invention;

Figure 9 is an enlarged detail view in partial cross-section of the axial blower differential accessory drive transmission for the arrangement of Figure 8;

Figure 10 is a typical flow diagram for the installation of the power unit of Figure 8 in an airplane or airplane wing;

Figure 11 is a cross-sectional view of boundary layer control apparatus optional to that shown in Figure 10, and arranged to cooperate with the power plant.

Referring to the drawings in which like reference numerals refer to corresponding parts throughout the several figures, the apparatus of the invention is as follows:

Figure 1:
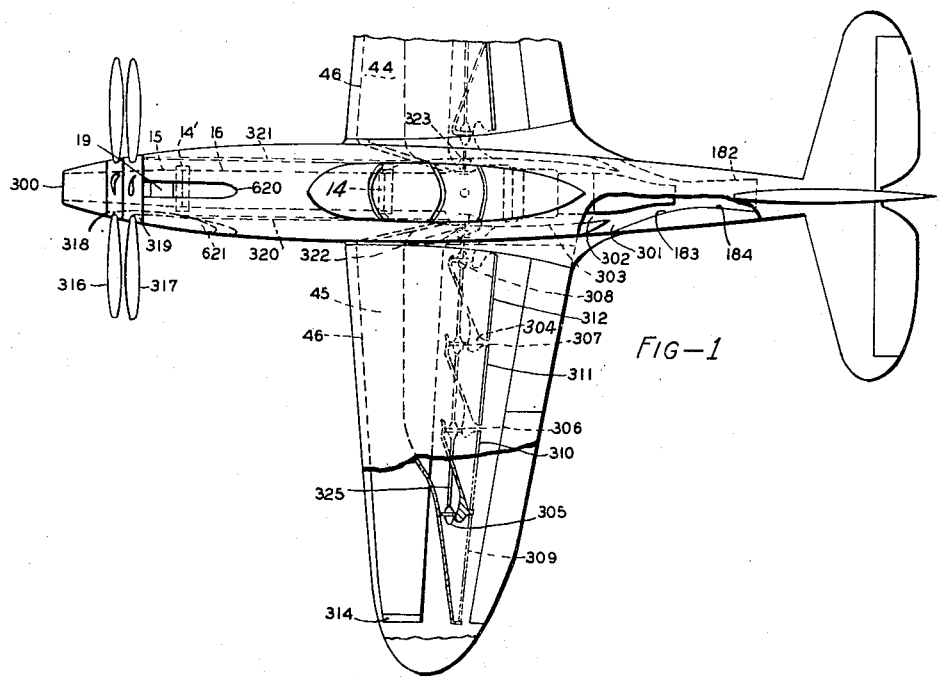
Figures 1 and 2 are general plan and side elevational views showing a typical installation of the invention in an airplane fuselage of an airplane equipped with wing boundary layer removal fans.

At the leading end of the jet power plant as shown in Figure 8, a cylindrical housing 10 is provided for the multi-stage axial blower $C_1$ which constitutes the first stage air compressor. The housing 10 is provided at the forward end with an annular opening 11 defined by a grooved spigot 12, both of which are of substantially full axial blower diameter and to which a forwardly directed conical ram 13 comprising a tubular conduit of truncated conical shape may be semi-flexibly attached by means of a short flexible coupling 14 as best shown in Figure 20, and also as shown in modified form at 14', 15—16 in Figure 2 and 17—18 in Figures 4 and 6. This ram or an extension thereof normally extends out of the leading end of the fuselage or the leading edge of the wing according to the type of installation, and faces forward into the relative airstream with the open end of smallest diameter foremost, whereby intake air may be caught and initially compressed in the ram by impact effected by the high velocity of the air relative to the aircraft under flight prior to its entrance into the beforementioned axial blower. Slots 620 and 621 are provided into which the foldable propeller blades 316 and 317 are adapted to be housed.

A plurality of axially spaced reinforcing rings 21 of suitably varying diameters are attached to the inside surface of the rotor shell 20 by suitable means such as by welding and furnace brazing, one such ring preferably being positioned opposite each row of the plurality of rows of impeller blades 25 and adapted to receive the inwardly extending impeller blade shanks.

The forward end of the axial blower rotor 20 carries a coaxially positioned, forwardly extending hollow spindle 26 with which it is rotatably supported in suitable bearings 27 which are in turn supported within the streamlined forward bearing housing 28. This forward rotor bearing housing 28 is supported and centrally positioned within the axial blower housing inlet spigot 12 by means of a plurality of interconnecting radially disposed, streamlined struts 29. The rear end of the rotor shell 20 is closed by the inner formed half 30 of the housing of a fluid coupling unit F, which in turn carries a coaxially positioned rearwardly extending spindle 32. The spindle 32 is rotatably supported in suitable needle bearings 33 within the end of the shaft 76 which is in turn rotatably supported centrally within the power plant housing by means of bearing 77 carried in a suitable lateral diaphragm or web 35; see Figure 9.

The axial blower housing 10 carries on the inside, a plurality of rows of inwardly extending, radially disposed, stationary diffuser vanes 37 arranged to stand intermediate the rows of impeller blades 25 and fitting with small clearances between said blades and said rotor shell. This housing is provided on the outside with a plurality of relatively deep intersecting, laterally and longitudinally disposed ribs 36 for the purpose of imparting sufficient stiffness thereto to maintain impeller-vane clearance to close tolerances.

The inner exhaust end of the axial blower terminates in a split double scroll outlet housing 38—39 having a pair of outlet spigots 40 and 41 which lead through suitable couplings 42—43 to suitable intercoolers which may be arranged in the airplane wings as shown at 44—45 in Figures 1, 2 and 4 to 7 and also as shown diagrammatically in Figure 10, and hereinafter more particularly described.

Located in the intermediate portion of the power plant and immediately to the rear of the axial blower transmission is the second stage air compressor unit $C_2$ which is preferably of a high speed multi-stage radial flow or centrifugal blower type as shown in Figure 8. This centrifugal blower comprises three additional stages of centrifugal compression 51, 52 and 53 in tandem arrangement with a liquid fed intercooler 54 intermediate its first and second stages.

A pair of inlet nozzle connections 55 and 56 serves to receive the first stage compressed air from the beforementioned wing intercoolers and to introduce it through the annular chamber 57 to the inlet 58 of the first centrifugal impeller 59. A plurality of stationary diffuser vanes 60 receive the compressed air from the impeller 59, and an annular chamber 61 serves to direct the flow of air therefrom to the inlet of the said liquid fed intercooler 54 which is more fully described hereinafter. The outlet 65 of the intercooler 54 communicates with the inlet 66 of the second centrifugal blower impeller 67 and the annular shaped chamber 68 formed in the body of the unit in turn serves to direct compressed air leaving impeller 67, after passing through the stationary diffuser vanes 69, to the inlet 70 of the third and final centrifugal compressor impeller 71. Air from the final stage impeller 71 passes through stationary diffuser vanes 75 to the entrance of the combustion chamber Z.

The beforementioned liquid cooled intercooler 54 is preferably constructed of a continuous metal tube wound in the form of a compact multi-layer helix, the turns of which are coaxially positioned with respect to the axis of the unit and with the turns spaced relative to one another by means of a plurality of perforated radially positioned fins, the whole being adapted to fit snugly in the annular chamber formed in the blower housing intermediate the first centrifugal stage discharge 61 and the second centrifugal stage inlet 65.

Similarly constructed intercoolers may be placed in the centrifugal blower housing intermediate each of the centrifugal blower stages.

Cooling is effected by circulation of a suitable liquid coolant such as ethylene glycol through the intercooler coils and through a suitable heat exchanger external to the blower as hereinafter mentioned in connection with Figure 10 in the description of the operation.

The three centrifugal blower impellers 59, 67 and 71 are fixed to a common shaft 76 which is rotatably journaled at its forward end in bearing 77, as best shown in Figure 9. The forward extension of the centrifugal blower shaft 76 couples into the axial blower and accessory transmission in a manner more fully described hereinafter. The rear end of the shaft 76 carries a bevel gear 82 which constitutes a portion of the counter-rotation transmission through which it is driven by the gas turbine G, also as more fully described hereinafter.

The beforementioned combustion chamber Z into which the final stage compressor discharges, is an approximately annular space defined on the outside by the housing 85 and on the inside by a shroud 86. The outside housing 85 and inner shroud 86 are formed to define a series of sidewardly interconnected, parallel cylindrical pockets or barrels having their axes equidistant from and parallel to the axis of the power unit and adapted to house the plurality of cylindrical burner tubes 88. The substantially annular combustion chamber Z, comprising said pockets or barrels, converges at the rear end to an annular nozzle ring 90 of reduced cross-sectional area and containing in the portion of reduced area a plurality of circumferentially spaced vanes as shown at 84 in Figure 8. The said combustion chamber nozzle ring 90 serves to hold a back pressure upon the combustion chamber and to efficiently discharge hot gases at high velocity from the combustion chamber into the expansion zone of the gas turbine G.

Fuel spray nozzles 105 discharge fuel and air under pressure into the forward ends of internal burner tubes 98 and are supplied with fuel and air under pressure from suitable sources.

The gas turbine G which is contained within a cylindrical housing 113 comprises a tapered rotor 115 having the approximate shape of a portion of an extremely prolate spheroid and being coaxially positioned within the power plant with the end of minimum diameter facing rearwardly in the direction of flow of the propellant gases. The said rotor 115 is splined and bolted to the rear end of a hollow, tapered shaft 118 which is in turn rotatably supported concentrically within the power unit.

The gas turbine rotor is provided with a plurality of rows of impeller blades or buckets as shown at 125 in Figure 8. A glow plug 91 serves as the igniting means for the combustible fuel-air mixture which is formed in and flows through the burner tubes.

The plurality of gas turbine stator blades as shown at 130 and which extend radially inward intermediate the rows of impeller blades are attached by welding at their outer root ends to the interior surface of the cylindrically shaped turbine housing 113.

Immediately to the rear of the gas turbine and attached at 155 to the gas turbine housing, is the secondary combustion chamber S and nozzle section N which comprises an approximately Venturi shaped housing 156.

An annular baffle 160 having a streamlined section similar to that of an airfoil is concentrically supported, adjacent the gas turbine exhaust within the entrance to the secondary combustion chambers, by means of a plurality of radially directed interconnecting streamlined struts 161. This baffle is preferably constructed with a leading edge portion 162 of heat resistant metal such as a nickel-chromium-iron alloy, and a body and trailing edge portion 163 of Carborundum or like refractory material.

The nozzle portion N is provided with an inner longitudinally movable annular throat member 165 supported and operated by a servo mechanism 166. The servo mechanism 166 is provided with a control or bleed duct connected through tubing 173 with a bleed control valve body 174, Figure 10, which may be located at any convenient place within the airplane structure. The valve bleed is vented to atmosphere. The needle valve stem is operatively connected through suitable linkage comprising a lever 179, rod 180 and bell crank 181 to a fly-ball speed governor 149 which may be driven from one of the gas turbine accessory drive shafts such as indicated at 589 whereby an increase or decrease of turbine speed will act through the governor 149, to respectively increase or reduce the needle valve opening. The lever 179 is pivotally supported upon a threaded shaft 153 by means of which the speed setting of the governor with respect to the needle valve action can be adjusted through a shaft extension 154 by means of a wheel 158 which may be conveniently located in the flight compartment.

The movable annular throat member 165 is so shaped that its axial displacement resulting from the speed responsive pressure variation in the servo mechanism, as influenced by the action of the needle valve bleed 174, as controlled by the governor 149 results in an effective change of nozzle area, at the same time maintaining streamline and high nozzle efficiency.

Adjacent the trailing edge portion of the inner divergent portion of the nozzle N is an external, concentrically positioned annular jet augmenter member 182 having inner walls convergent at 183 and divergent at 184 matching in contour that of the fixed divergent inner portion of the nozzle N. The augmenter member 182 is adapted to be supported by suitable means from the body of the power unit or from the airplane fuselage or wing in which it may be installed as illustrated in Figures 1, 2, 4 and 6 and as hereinafter more fully described. Under certain flight conditions the augmenter increases thrust as much as 25 percent.

Power is adapted to be transmitted from the gas turbine to the radial and axial blowers and to the various auxiliary drive shafts throughout the unit through suitable gear transmissions which comprise the following apparatus:

Referring primarily to Figures 8 and 9, the forward end of the hollow gas turbine shaft 118 carries a bevel gear 185 which meshes with a plurality of bevel pinions as shown at 186, each splined to the inner end of a radially positioned auxiliary drive shaft such as shown at 589 in Figure 10. The said auxiliary pinion drive shafts are arranged to pass radially through the forward portion of the combustion chamber through tubular housings and out of the combustion chamber housing through stuffing boxes as indicated at 191.

Fixed to the rear end of the radial blower shaft 76 is a bevel gear 82 which also meshes with the before mentioned bevel pinions 186. Shafts 76 and 118 are thus adapted for counter-rotation with respect to one another, through the action of the transmission comprising bevel gears 185 and 82 and bevel pinions 186.

Referring now primarily to Figure 9 which shows, in enlarged detail, the type of axial blower transmission employed. The centrifugal compressor shaft 76, as before stated, is rotatably journaled at the forward end in bearing 77. A conical flange 193 connects the shaft 76, just forward of the bearing 77, with a planetary drive spider 194. The spider carries six parallel shafts upon which are rotatably mounted six planetary pinions as shown at 195. A further extension 196 of the shaft 76, forward of the planetary drive spider 194, enters the fluid coupling housing 30—31 and carries fixed on the end thereof the fluid coupling impeller 199. The just mentioned forward shaft extension 196 makes a rotatable fit over the rear axial blower shaft 32 at 200. A laterally directed drilled hole 197 is provided to interconnect the fluid coupling housing with the bore 198 of the rear axial blower shaft 32 through which oil may be introduced under suitable pressure into the said coupling. Annular clearance 211 between the outside of shaft 32 and the coupling housing entrance is provided for continuous escape of oil from the coupling unit.

The beforementioned planetary pinions 195 mesh with an inner sun gear 201 which is keyed to the axial blower spindle 32 at 202 and they also mesh with an outer planetary ring gear 203 formed on the inside diameter of the bevel accessory drive gear 204.

The ring like-unit comprising the bevel gear 204 and the planetary ring gear 203 is rotatably supported upon the outside shoulders of the planetary spider 194 by means of a pair of suitable ball bearings 205. The bevel gear 204 meshes with a plurality of bevel pinions as shown at 207 which is carried on radially positioned outwardly extending accessory drive shafts as shown at 208 which are rotatably supported in suitable bearings 209 carried in the transmission housing 210. The said outwardly extending accessory drive shafts make external connection with auxiliary variable speed apparatus as more fully described in connection with the auxiliary apparatus and controls of Figure 10. An oil scavenging line for withdrawal of oil discharged from the fluid coupling enters the bottom of the transmission housing at the lowest point as shown at 585.

Figure 2:
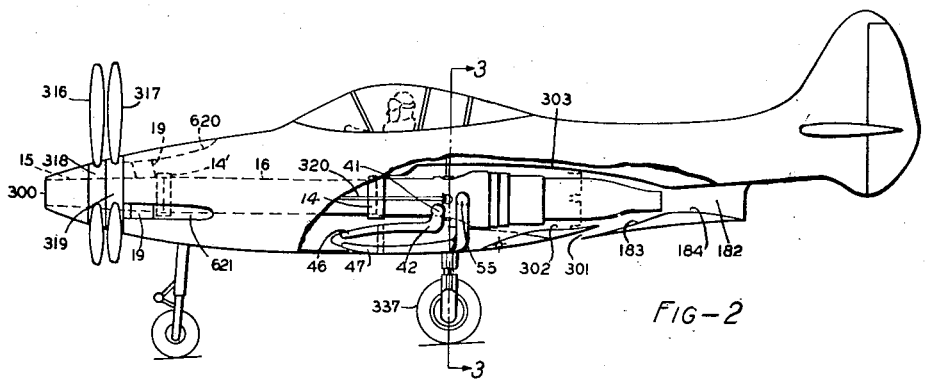
Figure 3:
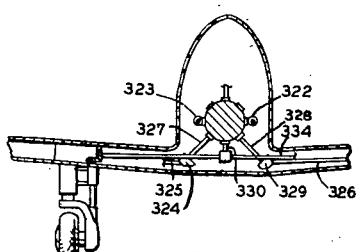
Figure 3 is a cross-sectional view taken on line 3—3 of Figure 2.

Referring now principally to Figures 1 to 3 in which a typical installation is shown, $$R—C_1—C_2—Z—G—S—M$$

indicate the relative positions of the various components of the power unit as located within the fuselage substantially coaxial with the thrust line of the airplane. The power plant is preferably isolated from the airplane structure by hoses or rubber pads or other resilient means to prevent transmission of high frequency sound (whine) to the aircraft structure. The isolation is not needed, however, for balance reasons because all the elements of the power plant may be in essentially perfect dynamic balance. The leading end spigot 12 of the axial blower $C_1$ makes semi-flexible connection at 14 as by a short reinforced neoprene hose, for example, to a tubular extension conduit 16, which in turn makes semi-flexible connection at 14' to the rear end of the conical ram 15. The forward end opening of the ram 15 extends through the foremost end of the fuselage as shown at 300.

The nozzle N of the unit is positioned to discharge rearwardly through a Venturi shaped jet augmenter member 182 having a forwardly convergent portion 183 and a rearwardly divergent portion 184 faired into and forming the lower rearward portion of the fuselage. An air duct 301 of semi-annular extent and opening inwardly through the fuselage skin forms the forward lower exposed edge of the forward portion 183 of the augmenter member 182. The balance of the forward portion of the augmenter member 182 also communicates through an annular duct 302 with the confined space around the power unit defined by a shroud 303, which in turn makes lateral connections with the inner lateral passages 304 within the wings which lead through the plurality of fans as shown at 305—308 from the boundary layer removal slots 309—312 which open through the top skin of the wing.

The axial blower outlet spigots 40 and 41, Figure 10, each make connection through suitable conduits, as shown at 42 and 43, to wing skin intercoolers 44 and 45 which are positioned spanwise in the wings. Each skin intercooler comprises an air-tight outflow and a return flow portion 46 and 47 interconnected at 314 and preferably bounded, in part, by a portion of the upper and lower wing skins respectively and adapted thereby to permit heat exchange directly through those portions of the wing skin to the relative air stream flowing in contact with the outside surface thereof. The pressure of the air discharged from the axial blower is sufficiently low to permit it to be confined in this manner directly in suitable portions of the wing structure, as for example, in corrugations directly underlying the skin. Thus the air can be intercooled to a temperature close to that of the wing air boundary layer. The return portions 47 of the wing intercoolers make connection through ducts 315 and 315' with the inlet spigots 55 and 56 of the second stage compressor $C_2$.

As shown in Figures 1 to 3, at the forward end of the fuselage and surrounding the ram 15, a pair of propellers 316 and 317 is rotatably mounted upon hollow hubs 318 and 319 and adapted for counter-rotation through suitable gearing by means of a pair of parallel shafts 320 and 321 which extend forwardly along the sides of the power unit. These parallel shafts are driven through bevel gears as shown at 322 and 323 in Figures 1, 3 and 9, from laterally extending auxiliary shafts such as those shown at 208 and 388, which enter the axial blower transmission as hereinbefore described in connection with Figure 9.

The series of boundary layer removal fans 305—308 contained in suitable housings provided in each wing, are rotatably carried on laterally extending lay shafts 325 and 326 which are driven from obliquely extending auxiliary drive shafts 327 and 328 through suitable bevel gears 324 and 329, as shown in Figure 3.

Referring now principally to Figures 4, 5, and 6, an illustration of a typical installation of the power unit within an airplane wing is shown. The leading and trailing edges of the wing are shown at 369 and 370 respectively, and the upper and lower cambered skin surfaces thereof at 371 and 372. The power unit $R—C_1—C_2—Z—G—S—N$ is shown submerged within the wing with its axis approximately on the chord line and perpendicular to the span of the wing. The forward end portion of the ram R emerges from the leading edge of the wing at 373 and 374, and the trailing portion of the nozzle augmenter 182 emerges from the upper and lower trailing edge portion of the wing skin at 375 and 376.

In the upper skin of the wing, boundary layer control slots may be provided as shown at 377 and 379, and both upper and lower surfaces of the wing may be provided with augmenter air duct slots as shown at 380 and 381 more fully described hereinafter.

The outlet spigots 40 and 41 of the axial blower $C_1$ make connection through suitable curved ducts 42 and 43 to the outward flow passages 46—46 of the spanwise arranged wing skin intercoolers 44 and 45. The return passages 47—47 of the wing skin intercoolers 44—45 make connection through suitable curved ducts 315—315 to the inlet spigots 55 and 56 of the radial blower compressor $C_2$.

The two auxiliary shafts 208 and 388, laterally projecting from the axial blower transmission as shown in Figures 4 and 7, extend spanwise through the wing and make geared connections at 389, 390 and 391 with a plurality of longitudinally positioned shafts as shown at 392, 393 and 394 which are adapted to drive boundary layer removal fans 395, 396 and 397.

Each of the boundary layer removal fans 395—397 communicates on the suction side with the beforementioned boundary layer removal slots 377 and 379 through suitable passages within the wing defined by the upper and lower wing skins and intermediately positioned walls as shown at 399 and 400. The exhaust ends of the fans communicate through similarly formed conduits as shown at 401 and 402 with a spanwise extending passageway 403. The said spanwise passage within the wing into which the boundary layer fans exhaust, communicates with the augmenter at the nozzle N through a substantially annular passage formed between the gas turbine and secondary combustion chamber housings G and S and the surrounding conically shaped baffle walls, the upper and lower sections of which are shown at 405 and 406 in Figure 6, and the side wall sections of which are shown at 407 and 408 in Figure 4.

The lateral air passage 403 may also communicate with a plurality of boundary layer control discharge slots opening through the upper skin of the wing as shown at 410—412. Walls 414 and 415 make an air-tight seal around the forward part of the axial blower portion of the power unit whereby substantially the entire length of the unit can be contacted and cooled by air circulated by the boundary layer fans. Compared to suction slots, discharge slots increase the kinetic energy of the boundary layer rather than swallowing the stalled boundary layer. Both types of slots reduce the momentum of wing wake, thereby improving aerodynamic efficiency of the airplane.

Referring now to Figure 10, a flow diagram illustrating the arrangement of suitable piping, manual and automatic controls, and auxiliary apparatus which may be associated with the power unit for its installation in an airplane, is shown.

The power unit hereinbefore described and shown at R—C₁—C₂—Z—G—S—N is provided with a pair of horizontally and oppositely directed auxiliary shafts 208 and 388 and obliquely extending auxiliary shafts 617 and 619 extending from the axial blower transmission. These auxiliary shafts make driving connection, through suitable gearing as shown at 389, 390 and 391 in Figures 4 and 5 and one of which is as illustrated at 389 in Figure 10, with the plurality of the beforementioned longitudinally positioned drive shafts 392 to 394 of the boundary layer removal fans 395 to 397. The auxiliary shaft 208 makes driving connection with one or more centrifugal coolant circulating pumps as shown at 420. The suction of said coolant pump 420 connects through suitable piping 421 with the outlet connection of a cooler 422 which may be located in any suitable position within the fuselage or wing and preferably adapted to effect heat exchange from the coolant to the air stream through the fuselage or wing skin. The discharge from the coolant circulation pump connects through a pipe 423 with the inlet of the surface intercooler 54 in the centrifugal blower housing. The coolant outlet 424 of the said surface intercooler is connected to the inlet of the cooler 422 through a pipe 425. Ethylene glycol or like fluid, may be employed as the circulated coolant material.

The boundary layer removal fans as shown at 395 are provided with blades 427, the pitch of which is adapted to be varied over a wide range by means of suitable gearing contained in the fan hubs 428, and which may be arranged as disclosed in United States Patent No. 2,294,350. Accordingly, said fan blade pitch varying mechanism in each hub is adapted to be actuated by means of push-pull rods which enter the front point of the hub 428 coaxially as best shown at 429 in Figure 10. Inward and outward motion of the rod 429 moves the fan blades to positions of smaller or greater angles of incidence relative to the air upon which said blades act when in rotation. A bell crank 430 pivotally supported within the airplane wing at 431 serves to reciprocably link said push-pull control rod 429 with rod 432, which is in turn pivotally connected at 433 with the outer end of a lever 434. The central pivot 435 of said lever 434 is pivotally carried at the lower end of a rod 436 which extends out through a stuffing box in the wall of a closed chamber 438. The said rod 436 makes connection at its inner end with the free end of a closed Sylphon bellows 439. The opposite, or relatively fixed end of the said Sylphon bellows 439 is carried on the lower end of a threaded adjustable rod 440 which extends upward and out through a stuffing box in the upper wall of the chamber 438. The top of the rod 440 is rotatably connected through suitable gearing 442 to a manual adjusting means 443 which may be located in the flight compartment of the airplane.

The end of lever 434 opposite to pivot connection 433 makes rotatable connection by means of a suitable ball and socket joint 445 to the outer end of a needle valve stem 446 of a needle valve 447 adapted to be closed upon extended downward movement of said stem. Pipes 448 and 449 make connection with the inlet and outlet connections respectively of said valve.

A spring 450 normally acting under compression, extends between the upper end of the needle valve stem joint 445 and a fixed portion 451 of the bellows chamber 438.

The interior of the bellows chamber 438 is connected by tubing 452 to one or both of the axial blower outlet scrolls as shown at 453, whereby the Sylphon bellows 439 is subjected on the exterior thereof to air pressure corresponding to that of the said axial blower discharge.

The central pivotal portion 435 of the lever 434 is elastically coupled by means of a coil spring 455 to one end of a horizontal lever 456, which makes pivotal connection at the opposite end 457 with the outer end of a primary fuel valve piston rod 460. A coil spring 461 serves as an elastic linkage between an intermediate point 462 of the lever 456 and a control lever 463 which may be located in the flight compartment in such position as to be conveniently manually operated by the pilot or flight engineer in a manner similar to the conventional enging throttle. In case the pilot or flight engineer's control station is remote from the power plant accessories, the throttle control lever 463 may be actuated from such remote station through suitable linkages or cable controls, not shown.

The above mentioned throttle control lever 463 is pivotally supported at 465 upon a suitable member of the airplane structure.

At a point on the control lever 463 intermediate the attachment point of the beforementioned spring 461 and the lever pivot 465, a second coil spring 467 normally acting under compression makes an elastic linkage to the outer end of a secondary fuel valve piston rod 468. An extended portion 469 of the control lever 463 is adapted, upon rotative movement of the control lever 463 along the sector 470 in the direction of the arrow 471, to first actuate the ignition and fuel pump switch 472 and then the starter switch 473 in succession.

The beforementioned primary and secondary fuel valve piston rods 460 and 468 enter through stuffing boxes 475 and 476 into the fuel valve housing 477, and are reciprocably supported and guided therein by an intermediate divisional wall 479 through which they slidably pass in a liquid and gas-tight fit. The inner ends of the piston rods 460 and 468 terminate in needle points 481 and 482 which are adapted, in the closed positions, to seat upon corresponding beveled outlet valve seats 483 and 484 from which outflowing fuel pipes 485 and 486 extend.

The said piston rods 460 and 468 carry a pair of pistons 487 and 488 fixed thereto at an intermediate point which make fluid tight sliding fit in a pair of cylinder bores 489 and 490 formed within the lower half of the valve housing 477 and interconnected at both ends by ducts 491 and 492. Air pressure and vacuum connections leading to the upper and lower interconnected heads of said cylinder bores by means of which a differential pressure can be established on the pistons 487 and 488 are shown at 493 and 494 respectively. The said pressure pipe connection 493 leads to the final stage air compressor discharge, at the inlet 145 to the combustion chamber, through an inlet nipple 495 passing through the combustion chamber housing. The vacuum pipe connection 494 makes connection through the combustion chamber housing at 496 to the Venturi section of one of the burner tubes.

Carried on the beforementioned piston rods 460 and 468 adjacent the needle points 481 and 482 are another pair of pistons 498 and 499 respectively which make a loose sliding fit in cylinder bores 500 and 501 formed in the upper half of the valve housing 477 above the division wall 479. The lower head ends of the said cylinder bores 500 and 501 are interconected by a duct as shown at 502 and are connected externally through a fuel supply pipe line 503 which leads from a pressure fuel feed pump P, which in turn, takes suction directly from the bottom of a fuel storage tank T to avoid possibility of suction line vapor lock. The upper head ends of the cylinder bores 500 and 501 are provided with centrally located outlet ports 483 and 484 which constitute the beforementioned beveled needle valve seats upon which the needle points 481 and 482 of the upper ends of the piston rods rest when in the closed position. The said outlet ports 483 make connection through the fuel supply pipe line 485 to the primary fuel burner nozzle manifold 112, and the outlet port 484 makes connection through the fuel supply line 486 to the combustion chamber housing at 504 and thence to the forward end of the rotor 115 where it is discharged into the supplemental combustion chamber.

A rheostat 506 having a common support with the fuel valve housing is adapted to be operated to vary the resistance thereof by means of a movable contact arm 507 pivoted at 508 and adapted to be actuated through a link 509 interconnecting the lower end of valve rod 460 and crank 510. The electrical circuit thus adapted to be varied is completed by means of the beforementioned ignition and fuel pump snap switch 472 through battery 511, conductor 512 and said resistance 506, through conductor 513 to the fuel pump motor $M_1$ and return by way of the ground connections shown. The electrical power input to the fuel pump drive is thus adapted to be varied as a function of the throttle setting and the fuel demand. At the same time a parallel circuit through the ignition glow plugs is completed by said switch 472 from battery 511 through conductor 132 and return through the ground connections.

The beforementioned oil line 448 connects through pipe 586 to the outlet of a centrifugal oil pump 587 which takes suction through pipe 588 from the oil scavenging outlet connection 585 in the bottom of the axial blower transmission housing. The oil pump 587 is adapted to be driven by an auxiliary drive shaft 589 which extends laterally from the counter-rotation transmission of Figure 25.

Also driven by auxiliary shaft 589 or another suitable one of the auxiliary shafts extending from the counter-rotation transmission, is a centrifugal air booster pump 590 which takes suction through line 591 from the discharge of the final stage air compressor at its inlet to the combustion chamber. The pump 590 discharges through pipe 592 to the injection air manifold 111 leading to the fuel spray nozzles in the burner tubes. This insures improved atomization of the fuel and removes radiant heat from burner nozzle parts by convection.

Referring now to Figure 11, an optional form of boundary layer removal mechanism is diagrammatically illustrated which may, under certain circumstances, be desirable over that shown in Figure 10. Here the auxiliary shafts 208—388 extending from the transmission make direct driving connection through suitable gearing with rotors such as shown at 515, of a centrifugal blower 516 suitably housed within the wing structure. A duct 517 connects a boundary layer removal slot 518 in the upper wing skin with the suction inlet 519 of the blower. An outlet duct 520 connects the discharge of the blower with a boundary layer control slot 521. A cylindrical valve 522 eccentrically rotatable about center 523 serves to reduce the area of the opening of slot 521 and to close it upon counterclockwise rotation to its extreme position and to open and increase the slot area upon clockwise rotation thereof. Rotation of said cylindrical valve 522 is effected by a lever 524 associated therewith and actuated through the link 432 by the pressure actuated mechanism hereinbefore described in connection with Figure 10.

The load characteristic of this system is such that as the rotary valve is closed the torque of the impeller becomes reduced, and a relatively high pressure air jet is formed at the control slot 521 to re-energize the boundary layer.

The operation of the apparatus will be described below, wherein it will be assumed that the power plant has been started by the starting means fully described in my application, Serial No. 433,599.

Upon advancing the control lever 463 from the starter position and along the power steps 1 to 4 of the sector 470 in the direction indicated by arrow 471, the compressive force of the spring 461 is further relaxed, tending to allow the primary fuel needle valve to open further and to feed a greater quantity of fuel to the burner jets. However, regulatory forces are immediately automatically superimposed upon the fuel control valve motion to meter the fuel permitted to flow to the burner jets in accordance with the quantity of flow of air through the combustion zone in order to insure a proper and efficient fuel air mixture and particularly to produce a nearly constant combustion temperature thereby limited to protect the gas turbine from thermal damage. These regulatory forces are applied to the needle valve stems, for example the primary fuel needle valve stem 460, in a direction tending to reclose the needle valve by means of the friction of the increased flow of fuel upward around the piston 498 and the force upon piston 487 is, as before-mentioned, applied through pipes 493 and 495 and tends to move the needle valve to an open position. The force applied to piston 498 is thus opposed to that applied to piston 487 and tends to return the valve to a closed position upon flow of fuel through the cylinder, said force being caused by the differential pressure imposed upon the piston 498 by frictional flow of fuel through the small clearance between the piston and cylinder walls and toward the valve outlet 483. The flow of fuel from the primary fuel valve is thus a modified combined function of the rates of flow of fuel and air to the combustion zone, which tends under all conditions to maintain a proper fuel-air ratio for any given power control setting.

Up to this point in the initial stages of operation of the power unit the supplementary fuel needle metering valve 484 has remained inoperative and in a closed position under the compressive force of spring 467. As the control lever is still further advanced over the power settings on the sector and nears the position marked supplementary fuel, the spring 467 reaches an elongation where its compressive force is reduced to a value permitting the supplementary fuel needle metering valve to lift off the valve seat 484 to allow supplementary fuel to flow through line 486, inlet fitting 504 in the combustion chamber housing, through pipe 570 and thence to the supplementary fuel orifices in the apex of the gas turbine rotor. Supplementary fuel is thus sprayed into the secondary combustion chamber S where it burns in the presence of the excess air carried in the gas turbine exhaust gases.

Still further advance of the control lever causes still further opening of the supplementary fuel valve 484 to supply an added quantity of fuel to the secondary combustion zone. The metering of the supplementary fuel is subject to the same automatic regulation as that before described in connection with the primary metering valve so that the total final quantity of fuel, both primary and supplementary, does not exceed that just required for the burning of all of the air leaving the gas turbine. Were it not for the flow controls described, raw fuel might be lost through the propulsive nozzle.

During the before described forward advance of the control lever 463, the rheostat has been actuated through the associated linkage hereinbefore described, to progressively decrease its resistance and thus to increase the power input to the fuel pump drive to produce a fuel pressure in line 503 which varies as an approximate function of the demand. The needle does not, in fact, appreciably throttle the fuel, but rather the fuel pump speed is directly controlled at the fuel source according to the fuel quantity requirement and the combustion air back pressure. The needle "trims" the flow to the exact quantity indicated with only small throttling action. This conserves electric power and prevents fuel vapor lock due to frictional overheating. Furthermore, this fuel pressure system makes possible the use of very small fuel lines since fuel pressure drop in lines is compensated for by the flow control. A further controlling factor is thus combined with the automatic characteristic of the fuel metering valve mechanism which tends to impart automatic regulatory characteristics to the unit as a whole. For example, in event the control lever is moved forward suddenly, an immediate increase in fuel pressure with momentary corresponding increase in flow to the burner will result. This momentary increase in flow of fuel will take care of the acceleration and increased primary and supplementary fuel requirements of the unit under high power output conditions.

The effect of the Sylphon bellows 439 and associated linkages including the spring coupling 455 to the lever 456 upon the before described fuel metering mechanism will be described hereinafter in connection with the description of the operation of the internal mechanism of the power unit, its auxiliary apparatus and the effects of variation of pressure altitude.

Assuming now that following the before described starting operations, a relatively low cruising speed of approximately 600 feet per second relative to the air at zero pressure altitude has been attained by the power unit and the associated aircraft, the operation of the internal components of the power unit are as follows:

Air entering the ram R at high velocity and at a pressure of 14.7 lbs. per square inch absolute, is compressed by impact to a pressure of approximately 18 lbs. per square inch absolute, at the inlet 11 to the axial blower $C_1$. The air is discharged from the axial blower at a pressure of approximately 26 lbs. per square inch absolute into the double scroll outlet housing 38—39 and thence through the outlet spigots 40 and 41 and ducts 42 and 43 to the wing skin intercoolers as best illustrated at 44—45 in Figures 4, 6, 7 and 10.

Cooled first stage compressed air from the said wing skin intercoolers returns through ducts 315 and 315' to the spigots 55 and 56 and thence to the entrance 58 of the first impeller of the multi-stage centrifugal compressor $C_2$. Compressed air from the first centrifugal rotor 59 passes through a liquid cooled surface intercooler 54 where it is again cooled and thence through centrifugal impellers 67 and 71 and finally through the diffuser vanes 75 into the entrance 145 of the combustion chamber Z at a final pressure of approximately 240 lbs. per square inch.

Here the compressed air is divided, a major portion flowing on through the internal passages of the burner tubes and through the substantially annular clearance spaces between the burner tubes and the combustion chamber housing 85 and inner shroud 86 and another portion of the air entering at 145 flows, for cooling purposes through the hollow turbine rotor.

The expanded and partially cooled gases from which a portion of the power has been extracted in passing through the gas turbine in the form of rotative torque applied to the turbine shaft 118, is discharged axially from the gas turbine expansion stages into the secondary combustion chamber S and thence out through the nozzle N in the form of a rearwardly directed and efficiently expanded high velocity reactive gaseous jet. The propulsive force exerted by the reaction of the gases leaving the said nozzle N is the thrust which is utilized in whole or in part to propel the unit and the aircraft with which it is associated.

When additional thrust is required and at certain times when maximum efficiency of operation of the unit is to be attained, more or less supplementary fuel injection into the secondary combustion zone S is employed.

The reactive gaseous jet issues from the jet N into the throat of the Venturi shaped jet augmenter member having a forward convergent portion 183 and a rearward divergent portion 184 faired into and forming a portion of the fuselage as hereinbefore described and as best shown at 182 and 184 in Figures 1 and 2. In Figures 4 and 6, a similar augmenter member is shown at 183 and 184 faired into the wing. The augmenters act to draw air from the atmosphere through the fuselage slot 301 and from within the boundary layer removal fan ducts 304 of the wings, from the wing slots 380 and 381 and also from the boundary layer removal ducts as shown at 403. The effect of the augmenters is to assist the jet in the rearward acceleration of a greater reactive volume of air than would otherwise be possible, and in addition to this the augmenter has the effect of decreasing the pressure at its throat adjacent the nozzle outlet, thereby increasing the velocity and correspondingly, the magnitude of thrust efficiency of the jet, particularly at the low relative air velocities associated with starting and take-off conditions of the aircraft. The removal of air at the slots by the beforementioned ejector action of the augmenter also improves the flow condition of the wing by swallowing turbulent air flowing along the wing skin surface.

The transmission of power from the gas turbine to the compressor and auxiliary equipment is as follows:

The high speed rotation of the rotor of the gas turbine G is transmitted through the turbine shaft 118 and through the before described counter-rotation transmission to the shaft 76 of the second stage centrifugal compressor C₂. The accessory drive shaft 589 driven by the bevel pinion 186 extends radially from a convenient portion of the transmission housing and serves to drive the beforementioned spray nozzle booster air pump 590 and oil pump 587.

The chief function of the rotation reversing transmission is substantially to balance or cancel out the gyroscopic effect of the various high speed rotating bodies within the unit, and its incidental value resides in the convenient facilities it provides for auxiliary drives of the type just mentioned. The balancing out of the gyroscopic forces is of great importance in a maneuvering type of airplane, particularly in a combat airplane, to avoid precessional effects while making quick turns or "pull outs" from a dive.

The balance of the power from the turbine, not absorbed in driving the auxiliaries and second stage compressor is transmitted on through the shaft 76 to the axial blower transmission hereinbefore described primarily in connection with Figure 11. The operation of the said axial blower transmission is as follows:

The rotation of the shaft 76 is imparted through flange 193 to the planetary drive spider 194 and the plurality of planetary pinions 195 carried therein and also to the fluid coupling impeller 199 carried within the housing 30—31 upon the concentric shaft extension 196. As before described, the said planetary pinions 195 mesh on the inside with the sun gear 201 fixed to the axial blower shaft 32 and on the outside with the ring gear 203 fixed on the inside diameter of the accessory drive bevel gear 204. The axial blower shaft extension 196 and the bevel gear 204 are thus differentially driven by the beforementioned planetary pinions. The bevel gear 204 meshes with the plurality of bevel pinions as shown at 207, which drive a number of accessory shafts extending radially from the differential transmission as shown at 208 and 388. The power transmitted through shaft 76 is thus divided by the planetary pinions 195, between the various accessory drive shafts and the axial blower shaft 32 or, in other words, the power transmitted through to the axial blower is the difference between the input of shaft 76 to the transmission and that absorbed by the accessory drives. The relative speeds of rotation of said auxiliary shafts and blower shaft are likewise differential.

Assuming that the fluid coupling is substantially empty of oil relative or differential speeds of the accessory drive shafts and the axial blower shaft will be entirely a function of the corresponding torque of the combined accessory drives relative to the torque of the axial blower. For example, if the torque on the accessory drive is light, resulting in its high speed, then the speed of the axial blower will be lower, but, if on the other hand, the load on the accessory drive is increased, resulting in lower accessory drive shaft speed, then the axial blower speed will be differentially higher. The methods by which the loading on the accessory differential drive is varied will be described hereinafter in connection with the boundary layer control apparatus.

Now if the fluid coupling housing is progressively filled with fluid by the introduction of oil under pressure from pump 587 by way of pipe 586, valve 447, pipe 449, fitting 576 and central bore 198 in shaft 32, and finally through the lateral inlet hole 197 in the coupling housing 30, the degree of coupling between the two shafts 32 and 196 may be progressively increased. In so doing the speed of the axial blower becomes progressively more directly dependent upon the transmission input speed of shaft 76—196 carrying the coupling impeller 199 and less dependent upon the differential effect of the loading of the accessory shafts, and the speeds of the accessory drives will at the same time be thereby increased with respect to said axial blower speed. In this manner a wide range of power distribution and relative speeds between the accessory drives and axial blower may be attained without the power losses customarily associated with variable speed drives which usually dissipate power wastefully.

In order to maintain the fluid couplings filled with oil, a constant supply must be maintained by the pump 587 to compensate for that constantly bled out of the fluid coupling housing through the annular clearance space 277 between housing 31 and shaft 196, and if the supply of oil is reduced below a certain maximum flow, or completely cut off as by closing the needle valve 447, the coupling will slowly empty itself of fluid in this manner either until equilibrium between the rate of supply and loss of fluid is reached, or until the fluid coupling is completely empty. The oil thus released from the fluid coupling is scavenged from the transmission housing through a suitable scavenging outlet connection as shown at 585 and returned through line 588 to the suction of the pump 587 as shown in Figure 10.

The differential power transmitted to the accessory shafts in the manner before described may be dissipated by driving of the boundary layer removal fans, coolant fluid circulating pumps and/or other accessory equipment. During cruising flight conditions the accessory power absorption from the differential transmission is largely controlled by varying the load on the plurality of boundary layer removal fans, and this is accomplished by variation of the pitch of the fan blades as hereinbefore described in connection with Figure 20; or the power may be varied by valving the boundary layer air as shown in Figure 11, thereby varying the power requirements for the boundary control centrifugal blowers 516. The torque requirement of the above named accessories tends to be greatest at times when the axial blower speed must be high, hence the load distribution through the differential is essentially self-regulating, affecting a large power saving. Not only is a variable speed drive thereby attained for the axial blower to increase its speed at altitude, but the propeller slows down correspondingly at altitude as its pitch increases subject to a pitch control of conventional type such as that shown in United States Patent No. 1,893,612 to Caldwell. Thereby shock losses are avoided in the propeller as the airplane translational speed increases and the velocity of sound decreases.

As previously stated, the axial blower speed is partially controlled or trimmed by governing the oil supply to the fluid coupling. This governing is accomplished by a needle valve 447, controlled by the Sylphon bellows 439 which is subjected on the exterior to the axial blower discharge pressure transmitted thereto through tube 452. If the axial blower pressure falls below a predetermined value the resultant reduction in pressure in the bellows housing 438 and the attendant expansion of the bellows 439 tends to close the needle valve and reduce the oil supply, thereby allowing the quantity of oil in the coupling to be reduced. This in turn reduces the degree of coupling between shafts 76 and 32 thus allowing the differential drive to function more freely to increase the axial blower speed relative to the input shaft 76 and thereby to apply a corrective effect upon the said axial blower discharge pressure. An increase of axial blower pressure above the same predetermined value similarly results in increased coupling between shafts 76 and 32 tending to reduce the axial blower speed relative to the shaft 76 and to apply again a corrective effect in the opposite sense upon the axial blower discharge pressure. Substantially constant axial compressor discharge pressure is thus maintained with variation in pressure altitude.

The expansion or contraction of the length of the said Sylphon bellows 439 corresponding to the respective decrease or increase of axial blower discharge pressure also acts at the same time through lever 434, link 432, crank 430 and through the mechanism before described in connection therewith in Figure 20, to increase or decrease the pitch of the blades of the plurality of boundary layer removal fans. The torque thus applied to the transmission accessory drive tends to vary inversely as a function of the axial blower discharge pressure, the effect of which is to apply a corrective effect through the differential transmission upon the axial blower speed.

For example, if the pressure altitude is increased with an attendant reduction in ram inlet pressure, the resultant initial reduction of the axial blower discharge pressure transmitted to and acting upon the Sylphon bellows 439 will tend to actuate the lever 434 and linkage leading from the lever pivot 433 to the push-pull rod 429 in such a manner as to increase the pitch of the boundary layer removal fan blades. The resultant increase in torque imposed on the same fans and the corresponding reduction in speed of the fan drive shafts will result, through the differential action of the transmission, in a corrective increase in axial blower speed which tends to return the axial blower discharge pressure to a constant value.

The initial setting and adjustment of the action of said Sylphon bellows 439 for predetermination of the axial blower discharge pressure to be maintained may be made by the threaded adjustment on screw 440 which may be actuated remotely through a shaft and gearing 442 by means of a manually operated wheel 443 which may be located in the flight compartment for convenience.

In Figures 1 to 3 the power plant unit controls and auxiliary equipment employed is identical to that described hereinbefore in connection with Figures 4 to 7, except that the auxiliary and accessory drive shafts may be rearranged to extend from the axial blower housing and the counter-rotation transmission housing at other points as may be conveniently suited to that particular aircraft structure and arrangement. Here the boundary layer fans for both wings, as shown for one wing at 305 to 308, are driven from the laterally extending shafts 325 and 326 through bevel gears 328 and 329 which are in turn driven from the obliquely extending auxiliary drive shafts 327 and 328. The said fans 305 to 308 act to draw in the boundary layer air through the wing slots 309 to 312, and by way of the wing ducts 304 deliver the air to the chamber formed around the power unit by the shroud 303 where it serves to cool the unit housing and from there the air moves rearwardly through the annular space 302 to the forward converging portion 183 of the augmenter 182 and on out with the propulsive jet issuing from the nozzle N and finally leaving the divergent portions 182 of the augmenter.

From the foregoing it will be evident that the invention may have a number of equivalent embodiments and several forms and arrangements of associated apparatus. It is to be understood that the foregoing is not to be limiting but may include any and all forms of method and apparatus which are included within the scope of the claims.

I claim:

1. An aircraft including an airfoil having a boundary layer removal slot, a turbo jet power plant including a turbine and a jet-discharging exhaust nozzle for the turbine, duct means for conducting boundary layer air from said slot to adjacent said nozzle for ejection with the nozzle jet, and means driven by said turbine for moving the air through the duct means.

2. An aircraft including an airfoil having a boundary layer removal slot, a propulsive jet power plant having a combustion chamber and a jet-discharging nozzle for the combustion gases, a shroud around the combustion chamber portion of the plant, and means for conducting boundary layer air from said slot to said shroud to move in heat-transfer relation to the power plant.

3. An aircraft including an airfoil having a boundary layer removal slot, a turbo-jet power plant comprising a gas turbine, a nozzle for discharging the turbine exhaust gases in the form of a propulsive jet, and a drive shaft driven by the turbine, duct means for carrying air from said slot to adjacent said nozzle to mingle with the gases of said jet, and means driven by said shaft for moving air through said duct means to remove the boundary layer and discharge the air thereof at said nozzle.

4. An aircraft including an airfoil having a boundary layer removal slot, a gas reaction propulsive unit comprising a combustion chamber, a turbine driven by the gases from said chamber, a nozzle for discharging the gases from the turbine in the form of a propulsive jet, and a drive shaft driven by the turbine, a shroud around the combustion chamber of said unit having an open end adjacent and facing in the same direction as the nozzle, duct means leading from said slot to the shroud, and means driven by said shaft for moving air through the slot and shroud to remove the boundary layer and to cool said unit.

5. An aircraft including an airfoil having a boundary layer removal slot and a boundary layer control slot, duct means connecting said slots, propulsion means including a gas turbine, nozzle means associated with the turbine for producing a propulsion jet, and compressor means driven by the turbine and supplying combustion air thereto, blower means driven by the turbine for circulating air through the duct means and having variable pitch blades, a control for said blower means responsive to pressure in the compressor means, and an operative connection between the control and blower means so that the pitch of said blades is varied when the pressure in the compressor means changes.

6. An aircraft including an airfoil having a boundary layer removal slot and a boundary layer control slot, duct means connecting said slots, propulsion means including a gas turbine, nozzle means associated with the turbine for producing a propulsion jet, and compressor means driven by the turbine and supplying combustion air thereto, means driven by the turbine for circulating air through the duct means, a valve for the duct means, control means responsive to pressure in the compressor means, and an operative connection between the control means and the valve so that the position of the valve is determined by the pressure conditions in the compressor means.

7. An aircraft including an airfoil having a boundary layer removal slot and a boundary layer control slot, duct means connecting said slots, propulsion means including a gas turbine, nozzle means associated with the turbine for producing a propulsion jet, and compressor means driven by the turbine and supplying combustion air thereto, blower means driven by the turbine for circulating air through the duct means including variable pitch blades, control means sensitive to pressure in the compressor means, an operative connection between the control means and the blower means whereby the control means varies the pitch of said blades in response to compressor pressure variations, and manual adjusting means for modulating the action of said control.

8. In combination with an aircraft having an airfoil, an essentially cylindrical internal combustion gas reaction propulsive power plant disposed with its longitudinal axis chordwise of the airfoil and constituting a prime motive power unit for the aircraft, the power plant including a heat generating means, compressor means having a ram inlet receiving air and having an outlet delivering compressed air to the heat generating means, and a nozzle communicating with the exhaust of the heat generating means and adapted to produce a propulsive jet of the exhaust gases to propel the aircraft, an augmenter for the nozzle having a forward portion which converges rearwardly and spanwise of the airfoil to form a mixing chamber into which said jet discharges and having a rearwardly divergent portion continuing rearwardly from said forward portion, a boundary layer removal slot in the airfoil, and ducting for conducting boundary air from the slot to sweep the exterior of said heat generating means and enter said convergent portion of the augmenter whereby the boundary layer air is removed through the slot and mixed with said gases in the mixing chamber.

9. In combination with an aircraft having an airfoil, an essentially cylindrical internal combustion gas reaction propulsive power plant disposed with its longitudinal axis chordwise of the airfoil and constituting a prime motive power unit for the aircraft, the power plant including a heat generating means, compressor means having a ram inlet receiving air and having an outlet delivering compressed air to the heat generating means, and a nozzle communicating with the exhaust of the heat generating means and adapted to produce a propulsive jet of the exhaust gases to propel the aircraft, substantially all of the air received by the ram inlet passing through the compressor and heat generating means for discharge from the nozzle, an augmenter around the nozzle including a forward portion having a rearward and spanwise convergence and constituting a mixing chamber which receives said nozzle and a rearwardly divergent portion extending rearwardly from said forward portion, a boundary layer removal slot in the airfoil extending spanwise thereof, and ducting leading from said slot for conducting the boundary air to sweep the exterior of said heat generating means and then enter said mixing chamber whereby boundary layer air is removed through the slot and mixed with said gases in said mixing chamber for discharge therewith.

10. In an aircraft, an airfoil having a boundary layer removal slot, a propulsive jet power plant associated with the airfoil and forming a prime motive power unit for propelling the aircraft, the power plant including a combustion chamber, means supplying compressed air to the chamber, and a nozzle for discharging the exhaust gases of combustion in the form of a propulsive jet, an augmenter for the nozzle including a forward portion which converges rearwardly and spanwise of the airfoil, and a rear portion which diverges rearwardly from the forward portion, and ducting for conducting boundary layer air from said slot so as to sweep the exterior of said combustion chamber and then enter said forward portion of the augmenter for ejection with said jet.

11. In an aircraft, a fuselage, an airfoil having a boundary layer removal slot, a propulsive jet power plant in the fuselage having a combustion chamber and a nozzle for discharging the combustion gases in the form of a propulsive jet, an augmenter for the nozzle having a rearwardly converging portion around the nozzle and a rearwardly diverging rear portion, and duct means for carrying boundary layer air from said slot past the combustion chamber in heat exchange relation thereto and thence into the forward portion of the augmenter for admixture with the jet gases.

12. An aircraft including an airfoil having a boundary layer removal slot, a reactive jet power plant for propelling the aircraft and including a combustion chamber and a nozzle for discharging the combustion chamber gases in the form of a propulsive jet, an augmenter for the nozzle, a duct system for conducting boundary layer air from the slot and conveying it past the combustion chamber of the power plant to move in heat exchange relation thereto and delivering the air to the augmenter for discharge therefrom with said jet, and power driven means for moving the air through the duct system.

13. An aircraft including an airfoil having a boundary layer removal slot and a boundary layer control slot, duct means connecting the slots, a power plant for propelling the aircraft, means driven by the power plant for moving air through the duct means, and a valve for controlling the exit of the control slot comprising a substantially cylindrical closure member arranged to restrict said exit, and means for supporting the valve member for angular movement about an axis eccentric to its cylindrical periphery so that the extent of restriction of the exit may be varied.

14. In a jet powered airplane having a body provided with an opening for the reception of external air, a jet power plant in the body having a combustor and a nozzle from which the propulsive jet issues for rearward discharge from the body, and a duct receiving the external air from said opening and extending rearwardly around the power plant to conduct the air in heat transfer relation to combustor and nozzle portions of the power plant to cool the exteriors of the same, said duct extending rearwardly around said nozzle to discharge said air with the propulsive jet.

15. In a jet powered airplane having a body provided with an opening for the reception of external air, a jet power plant in the body having a combustor and a nozzle from which the propulsive jet issues for rearward discharge from the body, a duct receiving external air from said opening and extending rearwardly around the combustor and nozzle regions of the power plant so that the air flowing through the duct cools the exteriors of said regions, and an augmenter for the nozzle having a rearwardly convergent forward part receiving said jet and said air from the duct and having a rearwardly divergent rear discharge portion.

NATHAN C. PRICE.

REFERENCES CITED

The following references are of record in the file of this patent:

UNITED STATES PATENTS

| Number | Name | Date |
|---|---|---|
| 1,375,601 | Morize | Apr. 19, 1921 |
| 1,847,093 | Martin | Mar. 1, 1932 |
| 1,913,644 | Stalker | June 13, 1933 |
| 1,922,167 | Leray | Aug. 15, 1933 |
| 2,041,795 | Stalker | May 26, 1936 |
| 2,085,761 | Lysholm | July 6, 1937 |
| 2,272,664 | Gropler | Feb. 10, 1942 |
| 2,340,396 | McDonnell | Feb. 1, 1944 |
| 2,346,178 | Mercier | Apr. 11, 1944 |
| 2,348,253 | Griswold | May 9, 1944 |

FOREIGN PATENTS

| Number | Country | Date |
|---|---|---|
| 458,428 | Germany | Apr. 10, 1928 |
| 589,420 | Germany | Dec. 7, 1933 |
| 626,326 | Germany | Feb. 24, 1936 |
| 383,821 | Great Britain | Nov. 24, 1932 |